April 5, 1966   R. W. DOWLING ETAL   3,244,072
OCULAR AND OBJECTIVE SHUTTER MECHANISM FOR
LATERALLY ADJUSTABLE BINOCULARS
Original Filed Aug. 31, 1961   7 Sheets-Sheet 1

INVENTORS
ROBERT WHITTLE DOWLING
LORENZO DelRICCIO
BY ALBERT GOLDHAMMER

ATTORNEYS

April 5, 1966      R. W. DOWLING ETAL      3,244,072
OCULAR AND OBJECTIVE SHUTTER MECHANISM FOR
LATERALLY ADJUSTABLE BINOCULARS
Original Filed Aug. 31, 1961                    7 Sheets-Sheet 2

INVENTORS
ROBERT WHITTLE DOWLING
LORENZO Del RICCIO
BY  ALBERT GOLDHAMMER

ATTORNEYS

INVENTORS
ROBERT WHITTLE DOWLING
LORENZO Del RICCIO
ALBERT GOLDHAMMER
BY
ATTORNEY

April 5, 1966  R. W. DOWLING ETAL  3,244,072
OCULAR AND OBJECTIVE SHUTTER MECHANISM FOR
LATERALLY ADJUSTABLE BINOCULARS
Original Filed Aug. 31, 1961  7 Sheets-Sheet 7

INVENTORS
ROBERT WHITTLE DOWLING
LORENZO Del RICCIO
ALBERT GOLDHAMMER
BY
ATTORNEYS

United States Patent Office 3,244,072
Patented Apr. 5, 1966

3,244,072
OCULAR AND OBJECTIVE SHUTTER MECHANISM FOR LATERALLY ADJUSTABLE BINOCULARS
Robert W. Dowling, New York, N.Y., Lorenzo del Riccio, Los Angeles, Calif., and Albert Goldhammer, Nussdorf, Baden (Bodensee), Germany, assignors to D and D Company, Inc., New York, N.Y., a corporation of Delaware
Original application Aug. 31, 1961, Ser. No. 135,182. Divided and this application Aug. 16, 1963, Ser. No. 302,681
4 Claims. (Cl. 88—35)

This is a division of application Serial No. 135,182, filed August 31, 1961.

This invention relates to binocular telescopes and specifically to improvements in shutter arrangements for binoculars.

The invention herein illustrated and described is incorporated in a binocular having two flat box-like lens casings mounted for transverse slidable movement upon a connecting central bridge. The lens casings are movable from a closed position wherein they completely envelop the central bridge to positions where the lens casings are moved transversely outwardly to provide interpupillary distance accommodation. The binocular thus presents a flat oblong shape which is easily carried or handled and may, when closed, be conveniently slipped into pocket or purse without the necessity of having a specially molded carrying case.

A binocular of the type described finds its greatest use as a sports glass or theater glass. Consequently, it is advantageous to make the objective lenses of the binocular of a generally rectangular outline and of greater width than height. This arrangement permits of a relatively wide or panoramic field of view while sacrificing only the field of view in a vertical direction, in which direction it is not generally needed for theater or sports use.

According to the present invention, slidable lens shutters are provided for each of the lenses of a binocular lens system. The shutters are automatically extended over the lens apertures when the casings are moved to closed positions. The shutters automatically uncover the lens apertures upon movement of the lens casings to a minimum interpupillary distance.

In combination with the foregoing are provided certain novel binocular constructions which form the subject matters of co-pending applications one of which concerns the arrangement of the optical elements within a box-like lens casing in a manner such that the overall height of the binocular may be reduced to a minimum. This is effected by inclining the planes of the light path through a casing with respect to a horizontal axis or axis of symmetry of the casing. In addition to reducing the height of the casing, a further advantage of the arrangement is that the binocular may be inclined somewhat when in use, which makes the binocular easier and less tiresome to hold.

Another aspect of the binocular involves novel means for mounting the optics of binocular lens systems and for providing movement of portions of the lens systems to effect focusing for each eye individually or in unison. One of the reflecting members of each binocular optical system is movable parallel to the optical axes to vary the distance which the light travels within a lens system. Thus, the compact shape of the binocular is unaltered by focusing adjustments since these occur by moving parts internally mounted within each lens casing.

Means are also provided in cooperation with the focusing mechanism to permit the user of the binocular to register, by a detent device, the position of long range focus adjustment. If, therefore, the owner of the binocular wishes to readjust the focus for short range viewing, he can return to the long range focus position by turning the focusing knob until he notices an appreciable resistance, which is the registered detent position.

Optical filters herein disclosed may be selectively brought into the light path in order to make possible or more convenient the viewing of certain events under conditions of extreme brightness or glare.

In the following description reference is made by way of a non-limiting example to one form of construction of a binocular devised in accordance with the invention, and illustrated in the accompanying drawings in which.

Figure 1:
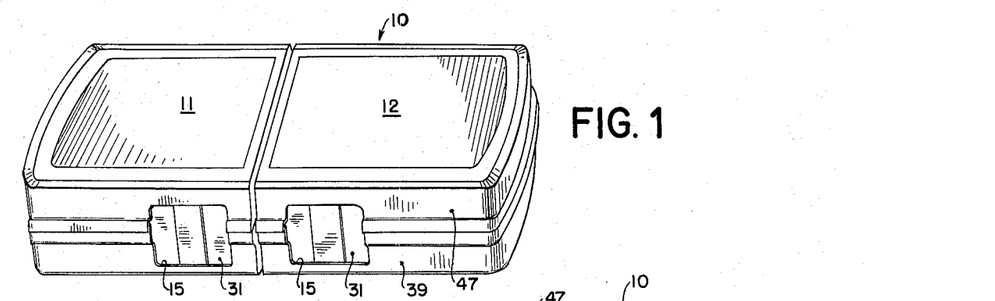
FIG. 1 is a perspective view showing the binocular of the present invention with the lens casings thereof in their closed positions and with the lens shutters shown covering the ocular lenses thereof.
Figure 2:
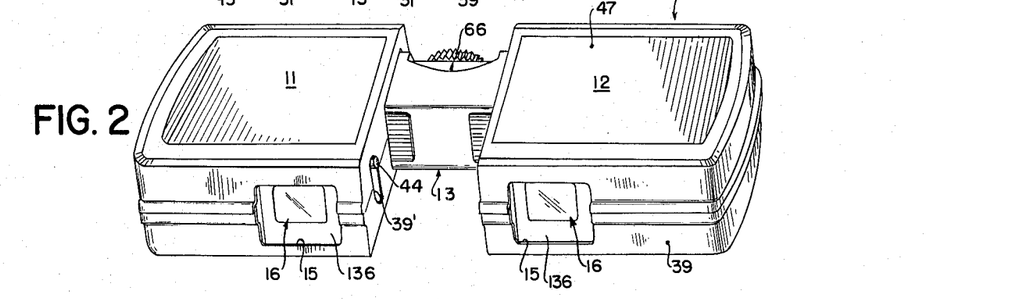
FIG. 2 is a view similar to FIG. 1 showing the lens casings in their open positions for interpupillary distance accommodation.
Figure 5:
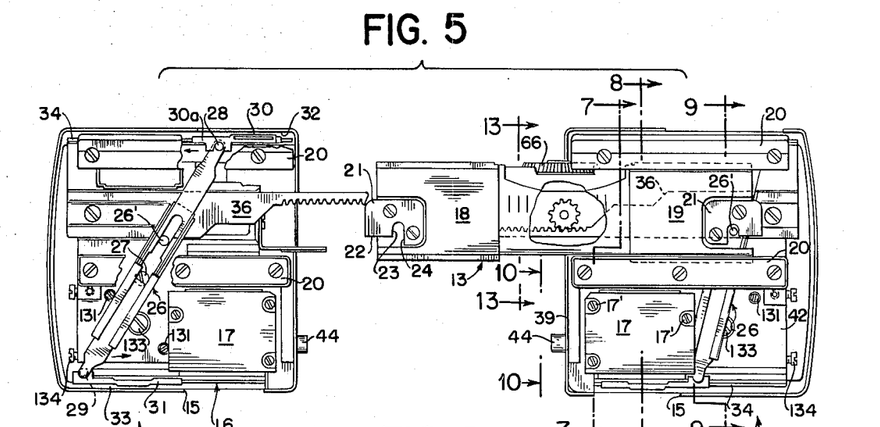
FIG. 5 is a plan view of the binocular of the FIG. 1 showing particularly elements of the lens casing and the intermediate central bridge permitting their relative slidable movement, and also elements of the lens cover actuation mechanism.

Referring now to the drawing and specifically to FIGS. 1 and 2, a binocular 10 has been illustrated which incorporates the several features of the invention. The binocular 10 has lens casings 11, 12 which are mounted for slidable transverse movement upon an interconnecting central bridge support 13. The degree of such movement for individual interpupillary distance accommodation may be recorded by noting the position of the casings relative to vertical indicia on the support (FIG. 5).

The binocular has ocular lens apertures 15 formed within each casing and ocular lens units 16.

Figure 6:
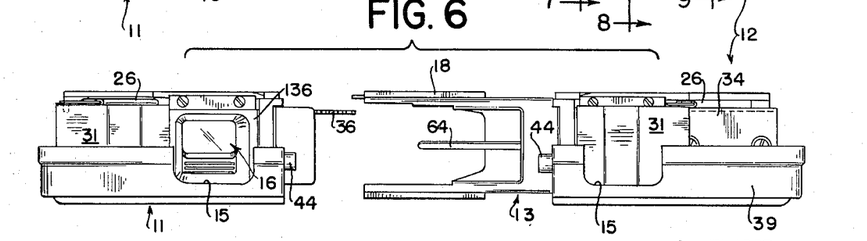
FIG. 6 is a side elevation of the binocular illustrated in FIG. 5.

The central bridge 13 comprises an elongate member having symmetrical arms 18, 19 (FIGS. 5 and 6) which extend into each of the lens casings 11 and 12. The arms 18, 19 are each of U-shaped cross section to present upper and lower portions thereof which are outside of the field of sight within a casing. Each casing is box-like in form, including a main frame or housing structure 42 having a generally hollow interior for mounting the various optical elements of a lens system, as will be described presently. The housing 42 mounts guide rails 20 which slidably receive the upper and lower portions of the U-shaped arms 18, 19 for permitting the lens casings to be moved outwardly along the central support.

LENS SHUTTERS

To each of the arms 18, 19 a cam 21 is attached by screws, each cam having a recess bounded by driving surfaces 22, 23 and 24. The lens casings each mount a telescoping actuating arm 26 rotatable about pivot 27. The ends of the arms 26 are pivotally connected at 28 and 29 respectively to lens shutters 30, 31 which are slidable within recesses 32, 33 within the lens casings. The shutters are plates which may be stamped to have embossed thereon a vertical segment which simulates louvered construction. The lens shutters 30, 31 have U-shaped upper and lower edges 30a, 31a respectively which in effect form grooves for receiving ridges 34 forming part of the lens casing structure (see FIG. 7). The ridges 34 and U-shaped sections 30a, 31a of the lens shutters comprise a means for guiding the lens shutters during their slidable movement within the recesses 32 and 33.

The arms 26 each mount a pin 26', a cam follower which cooperates with the cam bracket 21 to rotate the arms 26 about pivot points 27, thus causing sliding movement of the lens shutters 30, 31. If, for example, the arm 18 were to move into the lens casing 11, the follower pin 26' would first contact surface 24 of the cam bracket 21 attached to arm 18. Further movement of the arm 18 into the casing 11 would cause counter-clockwise rotation of the lens shutter actuating arm 26 about pivot 27. The arm 26 would then move simultaneously each of the lens covers 30, 31 across the related lens apertures in the direction of the arrows. During this entire movement, the pin 26' is in contact with the surface 24 of the cam bracket 21 but tends to move up into the slot to the position illustrated in the right hand portion of FIG. 5 with respect to lens casing 12.

When a lens casing is moved outwardly along the central support, the surface 23 of each cam bracket 21 hooks against its respective pin 26' by reaction of the pin against surface 23 of the cam, to pull the pin and to cause reverse rotation of the arms 26 for effecting uncovering of the lens apertures. The movement of the lens shutters therefore will begin immediately upon outward movement of the lens casings and continues to a position of minimum interpupillary distance accommodation at which point lens covers are completely shifted away from the lens apertures. The construction of the cam bracket 21 and the location and movement of the pin 26' is such that when the shutters are completely withdrawn from the lens apertures, the pin 26' will move out of the slotted portion of the bracket 21 and slide against the straight surface 22 of the cam bracket, thereby effectively uncoupling the bracket from the pin. Upon return movement of the lens casings to positions approximating a minimum interpupillary distance, the surfaces 24 of each cam bracket will engage the respective pins 26' and the shutters will be moved over the lens apertures.

Figure 13:
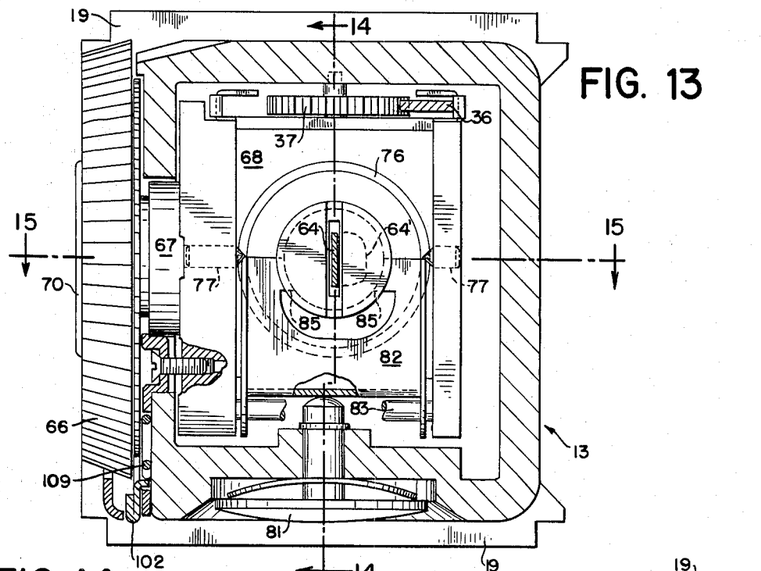
FIG. 13 is a transverse cross section view taken substantially along line 13—13 of FIG. 5, illustrating various interrelated portions of the focusing mechanism within the central bridge member.
Figure 14:
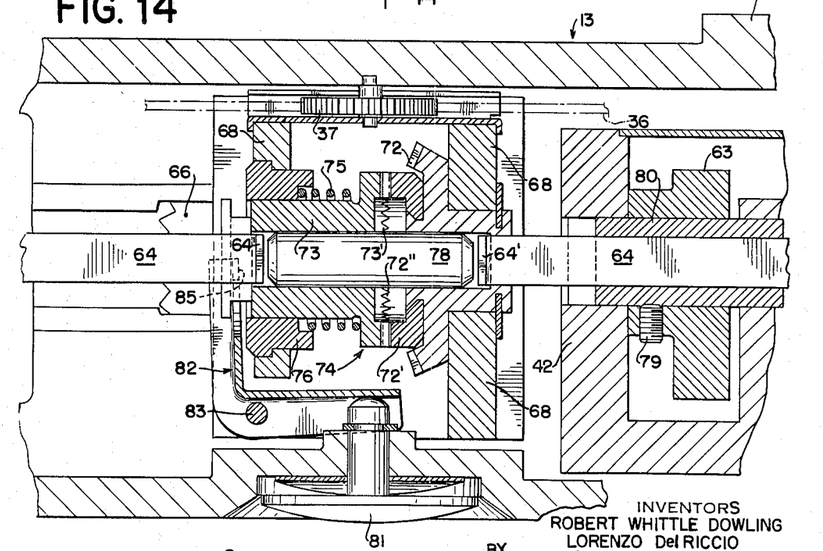
FIG. 14 is a vertical longitudinal cross section of the central bridge normal to the optical axes taken along line 14—14 of FIG. 13.

In order to assure equilateral displacement of each of the lens casings 11 and 12 with respect to the central bridge each of the casings mounts a rack strip 36 whose teeth mesh with a freely rotatable pinion 37 mounted to the central support (FIGS. 5, 13, 14). Thus, when the lens casings are displaced from their closed positions, the displacement of one casing will be equal to the displacement of the other. It will be understood that the central support 13 includes stops (not shown) which abut portions of the lens casings and which terminate or limit the outward movement of the casings.

LENS OPTICAL FILTERS

Figure 7:
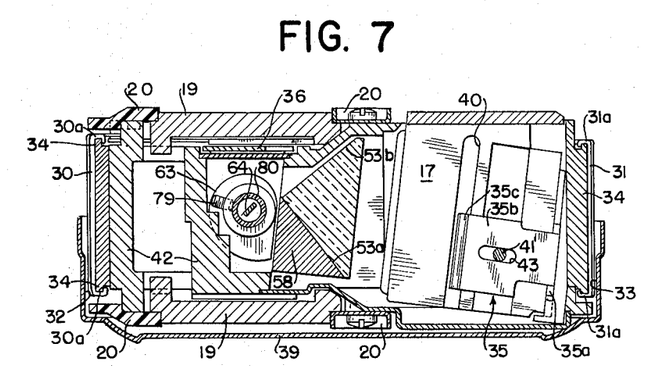
FIG. 7 is a cross-sectional view taken substantially along line 7—7 of FIG. 5.
Figure 8:
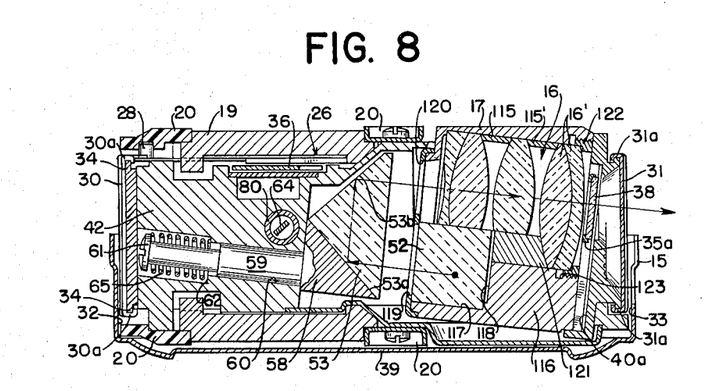
FIG. 8 is a cross-sectional view taken substantially along line 8—8 of FIG. 5.
Figure 12:
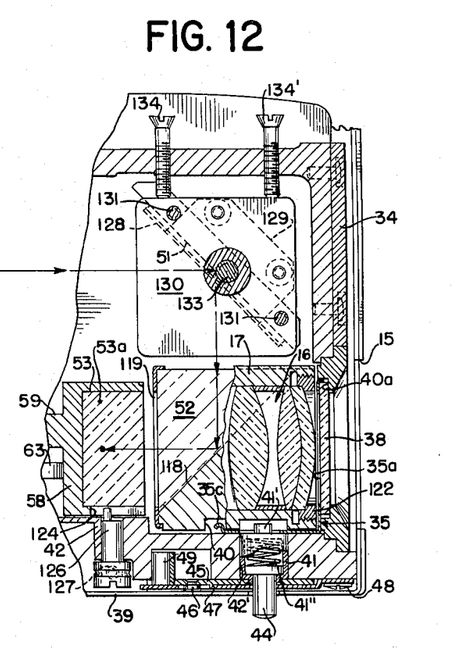
FIG. 12 is a cross-sectional view taken substantially along line 12—12 of FIG. 11.

According to another feature of the present invention, optical filters are provided which may be selectively moved across the optical axis in each casing to protect against glare, strong sunlight, etc. With reference particularly to FIGS. 7, 8 and 12, a filter frame 35 having front and side portions 35a, 35b is provided which holds an optical filter 38. The frame 35 is slidable in a direction normal to the optical axis and is guided in such movement by both a rearward tang 35c which slidably engages the edge of a groove 40 in the ocular lens mount and the walls of a slot 40a formed in the outer portion of the ocular lens unit 16. A button receptacle 41 is slidable in a vertical groove 42' in the housing structure 42. A pin 41' (FIG. 7) extends from the button receptacle 41 into a slot 43 formed in the side 35b of the filter frame 35. This arrangement permits the filter frame 15 to follow a path normal to the inclined optical axis and the button receptacle 41 to move in a true vertical direction. The outer end of the button receptacle is connected to a semicircular disc 45 which mounts a pin 46. Outwardly of the disc 45 and adjacent thereto is a plate 47 attached to the housing structure 42 by means of screws 48. The plate 47 has a slot 47' which receives the pin 46 and consequently, when the button receptacle 41 is moved vertically, the disc 45 will be forced to pivot within the slot 47' of the plate 47.

An actuating button 44 is mounted within the receptacle 41 and is normally urged outward by a spring 41" therein. The button protrudes through a vertical slot 47" in the plate 47 and through a similar aligned slot 39' in an outer cover plate 39. When the casings are in closed closely adjacent positions, however, the button 44 will be urged against the spring and into the body of the receptacle 41.

The semicircular disc 45 has a rounded inner edge portion which presses against a rounded leaf spring number 49. The construction and relationship of the spring 49 and disc 45 is such that the disc will urge the receptacle 41 into one or the other of its end positions and will act as an over-center resilient actuator upon release of the button in an intermediate position. An additional valuable function of the disc 45 is to slide intermediate the housing structure 42 and the outer plates 47 and 39, each of which is grooved or slotted to provide passage for the button 41. During such sliding movement of the disc 45, the respective groove and slots will be covered by the disc against the possible ingress of dirt or other foreign materials into the casing.

BINOCULAR LENS SYSTEM

With reference to FIGS. 3, 4, 8, 9 and 12 it will be observed that the light path proceeds through the objective lens 50 and is reflected by the mirror 51 at right angles to its initial direction. A prism 52 then receives the light, reflects the light forwardly at a right angle to a first reflecting surface 53a of the second prism 53. The surface 53a reflects the beam of light upwardly to be reflected again rearwardly by a second surface 53b, from which the light proceeds through the ocular lens unit 16.

Figure 4:
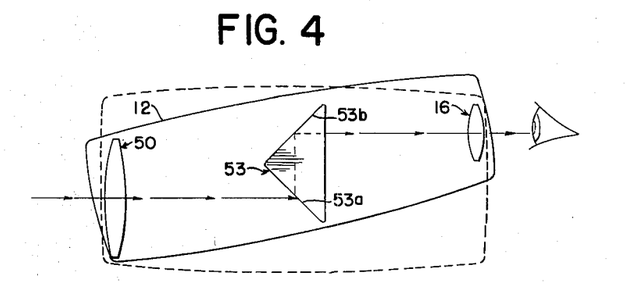
FIG. 4 illustrates the manner in which the optical elements of a lens system are tilted respective of a horizontal axis through a lens casing.

It will be observed with reference specifically to FIG. 4 that each of the optical units are arranged to cause the planes of the light path to be inclined with respect to a reference plane or axis of symmetry passing intermediate the top and bottom walls of a lens casing, whose outline has been indicated in solid line. The objective and ocular lens units are however, arranged substantially along the axis of symmetry of the casing, consequently, the height of the casing is less than if the lens elements were mounted in the conventional manner (as indicated by the dotted outline) so that the planes of the light path are parallel to the top and bottom of a casing.

A further advantage to the disclosed arrangement is that during the viewing of an event, the binocular may be downwardly inclined (solid line position of FIG. 4) which position is more restful to the arms of the user.

Figure 3:
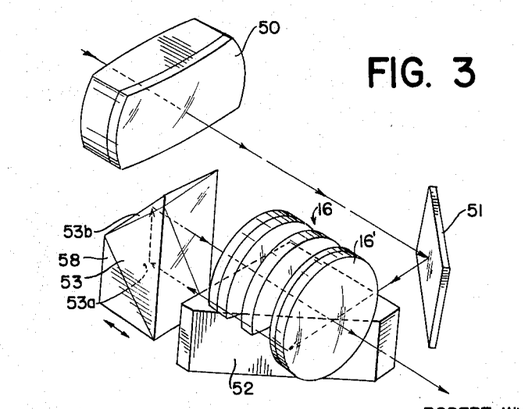
FIG. 3 is a perspective view showing the arrangement of the optical elements within a single lens system.

With reference to FIG. 3, it may be observed that the prism 53 is movable in a direction parallel to the light path as indicated by the arrow. As will be described presently with specific reference to structural details, the prism 53 is movable in order to provide focusing adjustment of each lens system. When the prism 53 is moved, the distance which the light must travel between ocular and objective lenses is increased or diminished to vary the focus.

The prism 53 need be moved only one-half the distance which would ordinarily be necessary for movement of an ocular lens unit, for example, in systems where the ocular lens is movable to provide focusing. Consequently, less focusing adjustment is required and the casing may be better sealed against the ingress of dust or other foreign particles than would be possible where the ocular lens unit is movable.

Figure 9:
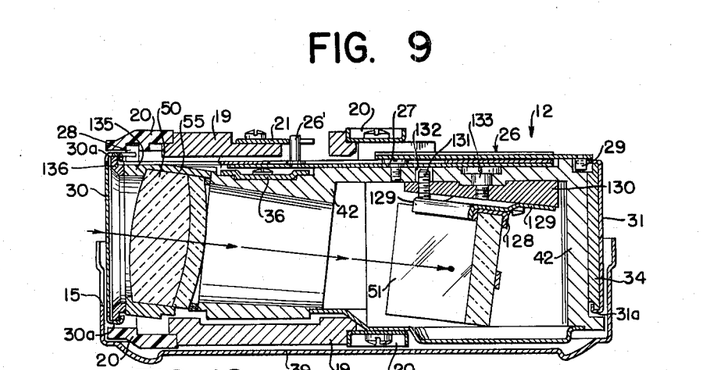
FIG. 9 is a cross-sectional view taken substantially along line 9—9 of FIG. 5.

Proceeding now to the structural details of the aforementioned lens system, we refer specifically to FIGS. 7–9 and 14 and 15. With reference to FIGS. 7–9, the objective lens unit 50 is inclined slightly with its upper edge toward the rear of the casing and is held securely within a lens mount 55 secured to frame 42. Light passes through the objective lens to the mirror 51 and from the mirror to the prism 52 (FIGS. 8 and 12) and therefrom in a forward direction to the movable prism 53. The prism 53 reflects the received light both upwardly and rearwardly through the ocular lens unit 16. Prism 53 is attached by cement to, or is made integral with a mount 58. Attached to the mount 58 is a shaft 59 which is slidable within a bore 60 formed within the frame 42. The end of shaft 59 is tapped to receive a threaded screw 61. Between the head of the screw and an abutment shoulder 62 defined by the frame 42, a helical spring 65 is disposed tending to bias the shaft 59 toward the forward or objective lens portion of the frame 42. The prism 53 may be shifted toward the rear of the casing by means of a cam 63 (FIGS. 7, 14 and 15) whose outer periphery is in the form of an archimedes spiral. The cam 63 may be rotated by a rectangular-shaped shaft 64 and when such rotation takes place, the surface of the cam will thrust the mount 58 and prism 53 toward the ocular lens 16. The spring 65 provides a return action.

FOCUS ADJUSTMENT

Figure 15:
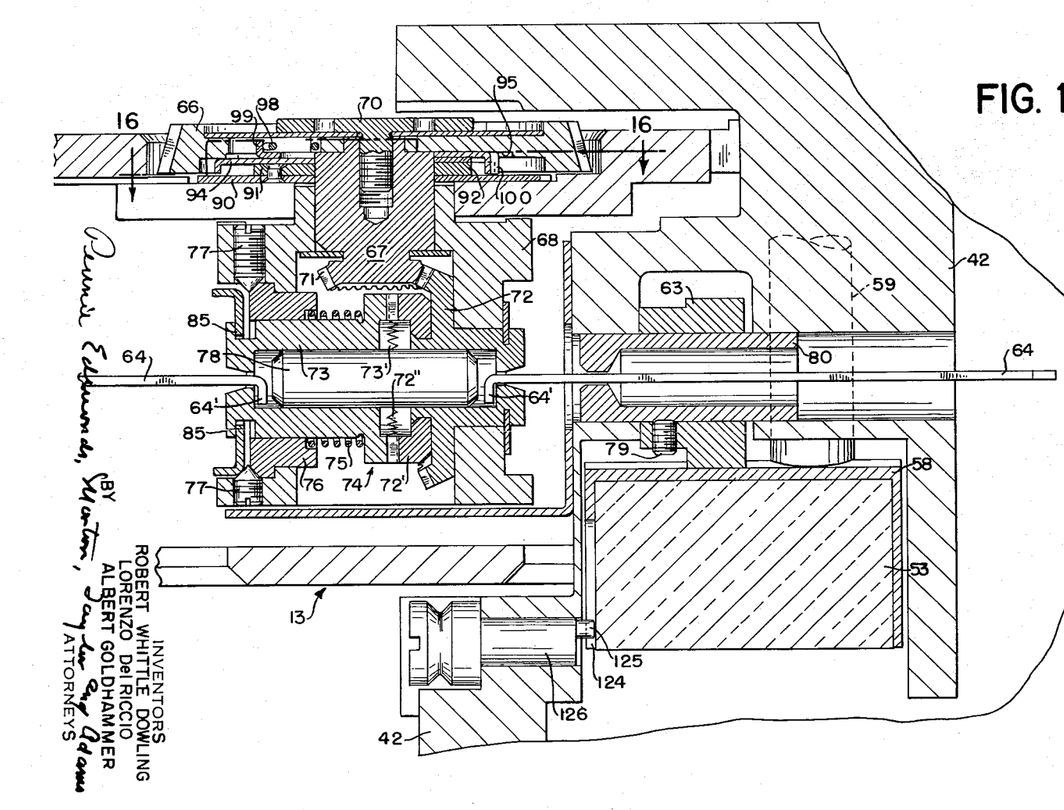
FIG. 15 is a horizontal longitudinal cross section of the central bridge taken along line 15—15 of FIG. 13.

With reference to FIG. 15, an externally operable focusing wheel 66 is connected to a drive shaft 67 by means of an oblong slot 69 (FIG. 16) and the screw 70. The drive shaft 67 therefore rotates whenever the focusing wheel 66 is rotated. At its lower end, the shaft 67 comprises a bevel gear 71 which meshes with a second bevel gear 72 rotatable within a clutch housing 68. The housing is fixed to the central bridge 13 and the gear 72 has attached thereto a member 72' forming part of a clutch generally designated by numeral 74. Radial serrations 72" normally engage similar serrations 73' on a movable member 73 of the clutch. The movable member 73 is biased against the member 72' by a spring 75. The spring 75 is seated in a counterbore in a journal 76 which is retained by means of the screws 77.

The members 72, 73 are hollow to receive the hooked ends 64' of two rectangular-shaped drive rods 64. Opposite ends of the rods 64 extend into the frame or housing 42 of each casing, and as shown in the right hand portion of FIG. 15 connect with one of the cams 63. The latter are mounted by the screws 79 to hubs 80 and each of the rods 64 is slidable with respect to its hub such that when the casings are in their closed positions, the ends of the rods extend for a distance beyond their connections with the hubs 80. The hooked ends 64' of the rods 64 within the clutch elements 72a and 73, prevent removal of the rods therefrom by frictional forces when the lens casings are moved outwardly relative to the central bridge 13. A tubular member 78 is located within the clutch 74 and acts as a stop against which ends 64' of the rods 64 abut when the lens casings are moved to closed positions. The free ends of the rod 64 opposite to the inner hooked ends 64' extend from the hubs 80 a sufficient distance to remain in engagement with the hubs in all positions of the lens casings.

The invention also provides for individual focus adjustment of the respective lens systems independently of each other. By operation of the focusing adjustment just described with respect to FIG. 15, both lens systems are focused in unison through the clutch 74. When this has been accomplished to the satisfaction of the user, he may uncouple the left-hand (as viewed in FIG. 15) focus adjustment drive rod 64 and continue to operate the focus wheel 66 to adjust the right hand prism 53 independently. The means for accomplishing this result is best seen in FIGS. 13 and 14 and comprises an externally accessible button 81 which when pressed, rotates a bell crank 82 about its pivot 83. The end of the bell crank 82 is connected by tangs 85 to the gear 72'. Element 73 it will be remembered is spring-biased into meshing engagement with the fixed clutch portion 72, but when the button 81 is depressed, the bell crank 82 will separate the element 73 from the portion 72' and rotation of the focus wheel 66 effects only actuation of the right hand prism shown in FIG. 15.

Figure 16:
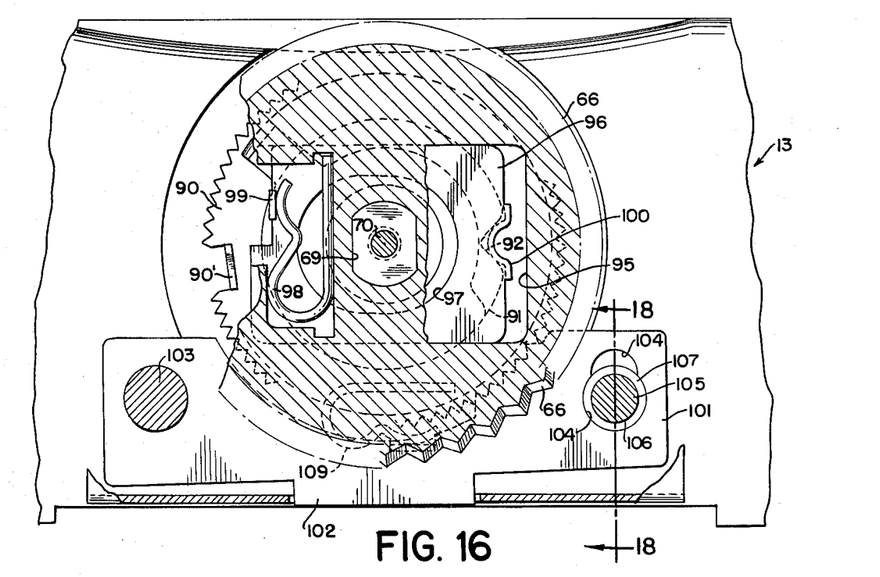
FIG. 16 is a vertical cross section illustrating the focusing knob and elements of the focus detent mechanism taken along line 16—16 of FIG. 15.
Figures 17, 18:
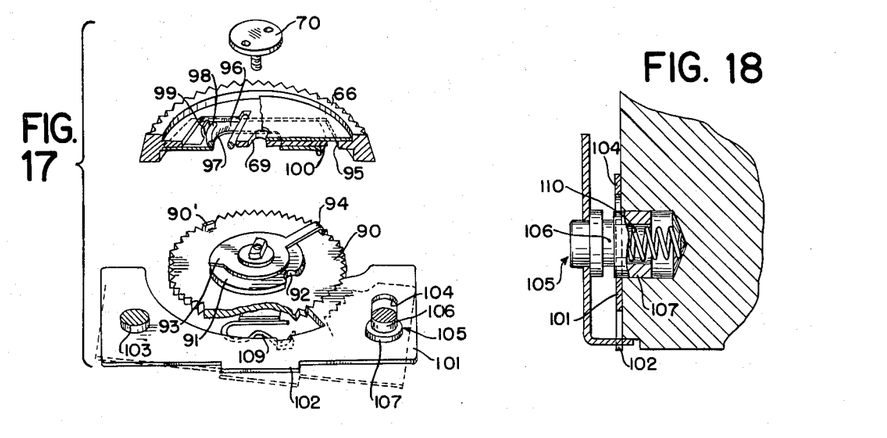
FIG. 17 is an exploded view of the elements illustrated in FIG. 16.
FIG. 18 is a section view taken along line 18—18 of FIG. 16.

As best seen in FIGS. 15, 16 and 17, a mechanism is provided in association with the disclosed focusing adjustment, to permit the user of the binocular to record or indicate for later reference the precise focus setting which for him is the correct long distance adjustment. For this purpose, a detent gear 90 having a stop 90' is freely rotatable about the drive shaft 67 and has attached to its upper surface a disc 91. The latter defines a tone point in its periphery a detent or recess 92. Immediately above the disc 91 and freely rotatable with respect to it and the detent gear 90, is a follower disc 93 carrying a stop arm 94. The focus wheel 66 on its underside defines a rectangular recess 95. Mounted within the recess 95 is a slide 96 which has a slot 97 to permit lateral movement of the slide relative to drive shaft 67. The slide 96 is biased toward the left as shown in FIGS. 16 and 17 by a spring 98 lying between the shaft 67 and an integral lug 99 forming a portion of the slide 96. The slide 96 at its edge opposite the lug 99 has a downturned lug or nose 100. The relationship of the component parts is such that the nose 100 is adapted to ride along the periphery of the disc 91 and being urged toward the left by the spring 98, the nose 100 will drop into the detent 92 when the focusing wheel moves the slide in a position adjacent to the detent. Thereafter, the rotation of the focus wheel 66 will also rotate the detent gear 90 unless the detent gear is prevented from rotation.

The detent gear may be selectively prevented from rotation with shaft 67 by engagement with the teeth of a registering lever 101. The lever 101 has a projecting tab 102 which extends externally of the central bridge 13 immediately below the focus wheel. When the user of the binocular has obtained his own individual long distance focus adjustment, and wishes to register or record the place at which this adjustment was made, he merely depresses the tab 102 which will cause the registering lever 101 to rotate about the pivot 103 and the teeth of the lever 101 will engage the teeth of the detent gear 90.

The detent lever 101 has a key-hole shaped slot 104. A spring-loaded button 105 (FIG. 18) has a smaller cylindrical section 106 corresponding to the narrow portion of the slot 104 and a larger circular section 107 which corresponds to the larger diameter section of the slot 104. Therefore, with the lever 101 in its dotted line position, the button 105 will be located within the narrow end of the slot 104 with the large diameter portion 107 held beneath the surface of the lever 101 (as shown in FIG. 18). A spring 109 normally maintains the lever 101 in the dotted line position with the tab 102 protruding from the central support. When however, the user wishes to move the detent lever 101 into engagement with the detent gear 90, he may push the tab 102 and the lever 101 will be moved into its solid line position. The button 105 will also be moved to the lower end of the slot 104 and due to spring 110, the portion 107 of the button will be forced into the larger diameter section of the slot 104, thereby holding the registering lever 101 in engagement with the gear 90.

However, the user may, notwithstanding the positioning of the nose 100 within the detent 92, rotate the focus wheel 66 to force the slide 96 and the nose 100 to move against the spring 98. The nose 100 will then again travel around the periphery of the disc 91. If the nose is moved clockwise about the disc 91, which is in the direction of short range focus adjustment, the nose 100 will not thereafter drop into the detent 92 after 360° of travel because the nose 100 will also travel around the follower disc 93 and against the arm 94 thereof. The latter will stop by abutment against stop 90' since that portion of the follower disc 93 adjacent arm 94 has a radius equal to the radius of the disc 91, the follower disc will in effect prevent the nose 100 from dropping into the detent 92. However, when the nose is moved counter-clockwise relative to the disc 91 or in a direction back toward long-range focus adjustment, the nose 100 will drop into the detent 92 upon coming to a position adjacent to the detent, which will serve as an indication to the user that he has arrived at the long range focus position.

ASSEMBLY AND MOUNTING OF THE OPTICAL ELEMENTS

As illustrated, in FIGS. 3 and 8 the lenses of the ocular lens unit 16 are cut segmentally except for the eyepiece lens 16'. The same applies to the spacers 115, 115' between the individual lenses. The ocular lens unit is mounted in a housing 17 which has a bevelled recess boarded by surfaces 117, 118. Surface 118 proceeds into the plane of the drawing at a 45° (FIG. 8) angle and serves as a bearing surface for the base (hypotenuse) of prism 52 (FIG. 12). In addition rectangular aperture stops 119, 120 are provided for image field limitation of the ocular lens unit and prism 52 at the end of the housing 17.

Figure 10:
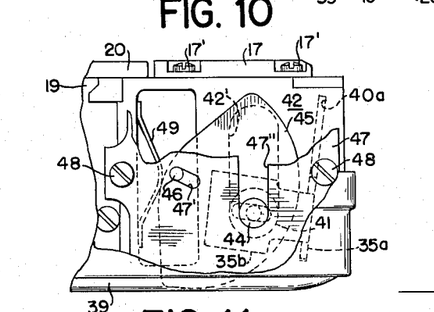
FIG. 10 is a detailed view in the direction indicated by arrows 10—10 of FIG. 5, disclosing the actuation mechanism for a lens filter.
Figure 11:
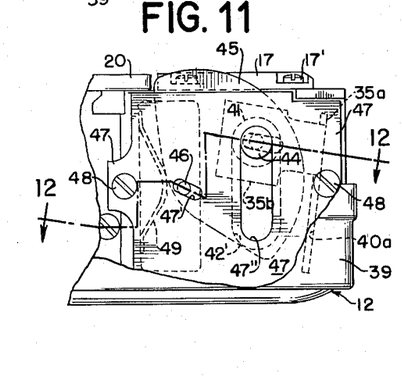
FIG. 11 is a view similar to FIG. 10 with the lens filter in position to cover an ocular lens.

During assembly of the component parts thus far described, the prism 52, the individual lenses of the ocular lens unit together with the spacers 115, 115' are placed into the housing 42 with an additional spacing member 121 which abuts the circular eyepiece lens 116'. The circular eye lens 116' is forced into a position of engagement with the spacing member 121 and the spacer 115' by a threaded cylindrical collar 122. The latter is appropriately recessed at 123 to receive a portion of the lens 116' and threadably engages the housing 17. The latter is secured adjustably to the body of the lens casing by screws 17 (FIGS. 5 and 10, not shown).

The prism 53 is locked against rotation by providing the mount 58 therefore with a guide groove 124 paralleling the optical axis as indicated in FIGS. 12 and 15. The mount 58 is engaged by a finger 125 which blocks the mount 58 against rotation. The finger 125 is formed as an eccentric extension of stud 126 so that rotation of stud 126 for adjustment purposes allows the mount 58 to turn to an extent about the optical axis. The stud 126 is itself secured against further turning, after adjustment, by rotation of a set screw 127.

As mentioned, light is received from an objective lens 50 by a mirror 51. The mirror is inclined with respect to the incident light at an angle of 45° and is adjustable with respect thereto. The mirror is secured in a mount 128 which in turn is secured to a resilient or spring-like member 129 secured to a base plate 130. Provided in the base plate 130 are two set screws 131 in suitably threaded bores serving as an abutment for the member 129. Hence, adjusting the set screws 131 will result in a perpendicular adjustment of the mirror 51, to the light path. Also provided in the frame 42 are openings 132 to render the screws 131 accessible from without.

Moreover, base plate 130 is secured rotatably to the frame 42 by a shoulder screw 133. The side of base plate 130 further is engaged by two set screws 134, 134' to fix the base plate in a given position of rotation about a circular extension on the frame 42. Thus, an adjustment of these screws 134, 134' will result in rotating the mirror about the axis of screw 133. By the foregoing adjustments, the mirror can be adjusted in two planes independently.

For purposes of mounting the objective lens unit 16, the unit is held within the lens mount 55 within a bore which at its rear end has a stop 135 for the objective lens mount. The objective lenses are held by the mount 55 attached to housing 42, and a closing frame 136 which is screwed onto the mount 55. At the same time, the frame 136 serves as a guide rail for the objective shutter.

It will be understood that the foregoing description relates to a particular embodiment and is therefore merely representative. Consequently, changes may be made therefrom without departing from the teachings of the invention. In order fully to appreciate the spirit and scope of the invention, reference should be made to the appended claims in which:

We claim:

1. In a binocular telescope having two lens casings transversely slidable upon a central support for interpupillary distance accommodation, a variable length actuating arm pivotally mounted to each lens casing, lens shutters pivotally connected at each end of said arm, said lens shutters being slidable within recesses extending laterally within the lens casings adjacent to the ocular and objective lens apertures therein and being slidable to positions where said shutters cover the lens apertures, means supporting and guiding the movement of the shutters and cam-follower pairs, one member of each pair being attached to each lens casing, and the other member of said pair being attached to said central support, each of said cam-follower pairs providing with said actuating arms, means for rotating said arms during movement of the lens casings to cover and uncover the lens apertures.

2. In a binocular telescope having two lens casings transversely slidable upon a central support, a variable length actuating arm pivotally mounted to each lens casing, lens shutters pivotally connected at each end of said arm, said lens shutters being slidable within recesses extending laterally within the lens casings adjacent to the ocular and objective lens apertures therein and being slidable to positions where said shutters cover the lens apertures, means supporting and guiding the movement of the shutters, a cam attached to each of said lens casings and a cam follower attached to each of said arms, said cam defining driving surfaces operative against the follower, said driving surfaces being constructed and positioned to engage the follower and to rotate the said arms during initial outward movement of each of said lens casings from closed positions, said driving surfaces being shaped to disengage from the follower during continued outward movement of the casings when the lens shutters have been removed from the lens apertures, return movement of each lens casing for a distance toward closed positions of the casings causing re-engagement of said driving surfaces with the follower to return the lens shutters to covering positions over the lens apertures.

3. A binocular telescope according to claim 2 which includes means for coupling the lens casings and the central support to provide equal lateral displacement of said casings, the driving surfaces of the cam engaging the follower only during opening and closing movements of the lens casing in positions less than the normal interpupillary distance accommodation range.

4. A binocular telescope having two box-like lens casings transversely slidable upon a central support, said central support including arms extending laterally into each of the lens casings above and below the field of sight through a casing, each arm mounting a cam defining a longitudinal driving surface and an open longitudinal recess, the sides of said recess also forming driving surfaces, said driving surfaces being positioned toward the center of the support, said cam also having a straight transverse surface adjacent to said driving surfaces and extending outwardly relative to said support, each lens casing pivotally mounting a telescoping actuating arm, lens shutters pivotally connected at each end of the telescoping arms, said lens shutters being slidable within recesses extending laterally within the lens casings adjacent to ocular and objective lens apertures therein and being slidable to covering positions respective of the lens apertures, each lens shutter having U-shaped upper and lower edges forming grooves to receive ridged portions of the lens casing structure, said ridged portions and U-shaped edges comprising a means for guiding the lens shutters during their slidable movement within and from the recesses in said casings, each telescoping arm mounting a follower which cooperates with said cam to rotate said arms relative to the casings when said casings are moved transversely relative to the central support, the follower bearing against said driving surfaces when the casings are shifted from a closed position to a position of minimum interpupillary distance to rotate the telescoping arms and move the lens shutters into the recesses provided therefor, movement of the lens casings from an opened position at a point of minimum interpupillary distance to fully closed positions causing said lens shutters to be withdrawn from the recesses to cover said lens apertures, the follower in all other positions of said casings being free to move along the straight surface of said cam in the absence of the rotation of said telescoping arms, and means for coupling the casings to provide for their equal lateral displacement relative to the central support.

References Cited by the Examiner

UNITED STATES PATENTS

| 1,024,730 | 4/1912 | Levy | 88—35 |
| 2,814,967 | 12/1957 | Haeseler | 88—33 |
| 3,062,098 | 11/1962 | Dowling et al. | 88—34 |

FOREIGN PATENTS 16,284   11/1915   Great Britain.

JEWELL H. PEDERSEN, *Primary Examiner.*